(12) United States Patent
Kiesbauer et al.

(10) Patent No.: US 9,033,308 B2
(45) Date of Patent: May 19, 2015

(54) CONTROL DEVICE WITH IMPROVED STEM CONNECTOR AND DISPLAY

(75) Inventors: Joerg Kiesbauer, Eppertshausen (DE); Holger Eckholz, Brechen (DE); Eugen Nebel, Nidderau-Windecken (DE); Dirk Hoffmann, Offenbach (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 743 days.

(21) Appl. No.: 13/165,067

(22) Filed: Jun. 21, 2011

(65) Prior Publication Data

US 2012/0001103 A1 Jan. 5, 2012

(30) Foreign Application Priority Data

Jun. 30, 2010 (DE) .......................... 10 2010 025 635

(51) Int. Cl.
 *F16K 31/126* (2006.01)
 *F16K 1/48* (2006.01)
 *F16K 51/00* (2006.01)

(52) U.S. Cl.
 CPC ............... *F16K 31/1262* (2013.01); *F16K 1/48* (2013.01); *F16K 51/00* (2013.01)

(58) Field of Classification Search
 CPC ....... F16K 1/526; F16K 1/48; F16K 31/1262; F16B 7/0406; F16B 7/105; F16B 7/1418; F16B 7/0426
 USPC ................... 251/318, 320, 335.1, 335.2, 291; 403/16, 26, 305, 307, 309, 312–314, 403/343, 373, 374.1, DIG. 8; 92/129, 140; 137/553, 556
 See application file for complete search history.

(56) References Cited

U.S. PATENT DOCUMENTS

| 763,123 A | * | 6/1904 | Stahl .............................. 137/596 |
| 3,253,610 A | * | 5/1966 | Pahl et al. ...................... 137/269 |
| 3,648,718 A | | 3/1972 | Curran |
| 5,706,856 A | * | 1/1998 | Lancaster .................. 137/556.3 |

(Continued)

FOREIGN PATENT DOCUMENTS

| DE | 1 043 739 | 4/1959 |
| DE | 10 2006 061 017 | 7/2008 |

OTHER PUBLICATIONS

Mounting and operating instructions—Series 240 Pneumatic Control Valve—Type 241-1 and Type 241-7, SAMS 10021—Annex CB, Edition Dec. 1994.

(Continued)

*Primary Examiner* — Marina Tietjen
(74) *Attorney, Agent, or Firm* — Schiff Hardin LLP

(57) ABSTRACT

In a control device for a technical processing plant, a pneumatically driven actuator having an actuator stem is provided together with a valve operated by the actuator, the valve having a valve stem. A valve element is attached to the valve stem. A stem connector connects the two stems to each other for a forced transmission of axial actuating movements and for modifying an axial distance between adjacent ends of the valve stem and the actuator stem to adjust a total axial length of the two stems. The stem connector comprises two half-shells connected to each other, and two positioning devices are provided for a friction-locking coupling of the half-shells to the respective ends. At least one of the positioning devices is designed to modify an axial attachment position of the half-shells along one of the stems.

7 Claims, 7 Drawing Sheets

(56) References Cited

U.S. PATENT DOCUMENTS

| | | | |
|---|---|---|---|
| 6,099,196 A * | 8/2000 | Lancelot, III | 403/313 |
| 6,840,272 B2 * | 1/2005 | Hildreth, Jr. | 137/545 |
| 2008/0149875 A1 * | 6/2008 | Hoffmann et al. | 251/285 |

OTHER PUBLICATIONS

Annexes A1 and A2—SAMS10019-10021 last modification date—2008.

* cited by examiner

CONTROL DEVICE WITH IMPROVED STEM CONNECTOR AND DISPLAY

BACKGROUND

The preferred embodiment relates to a control device for a technical processing plant, in particular an industrial processing plant, that can be employed in the technical domain of chemistry, petro-chemistry, gas processing, production of pharmaceuticals, foodstuffs, cellulose, paper, glass, steel, cement and the like. In an industrial processing plant technical processes are running wherein continuously or discontinuously fluid streams relating to a main process are acted upon. For example, in large chemical plants, in pharmaceutical plants, in steel making and cement production, in a waste incineration plant, a foundry, etc. process fluid streams are formed that are to be adjusted according to process and operation depending on certain control variables such as temperature or throughput amount. In industrial processing plants also raw materials may be obtained such as metal from ore. Therein the raw material of a processing routine may itself be the product of a preceding process. Also the production of finished products or the recycling of raw material from waste and garbage falls into the technical domain of process engineering.

A generic control device for a technical processing plant is known from the published patent application DE 1 043 739, in which a stop valve is to be actuated by a pneumatic actuator. Besides the pneumatic actuator the control device has a control valve designed to adjust a process fluid stream. An actuator stem is coupled to a valve stem via a stem connector formed as a sleeve and providing an unalterable coupling between the valve and the actuator stem. At the valve side the sleeve has an internal thread engaging with an external thread at the end section of the valve stem. Two predefined positions can be set by means of the thread coupling between the valve stem and the actuator stem in order to vary the total length of the stem arrangement and provide a different functionality of the stop valve.

A similar, proven control device structure is known from DE 10 2006 061 017 A1, in which the stem connector is a sleeve that is unadjustably connected to the actuator stem via a head-groove-connection while a threaded engagement is present between the valve stem and the end of the sleeve facing the valve stem.

For the known control device it became apparent that after mounting the control valve it is difficult for an operating person that has to check processing procedures of the plant without being very familiar with the control valve to determine how large is the maximum stroke length, i.e. what maximum valve opening the valve member may adopt relative to the valve seat.

In particular when mounting and unmounting of the pneumatic positioning actuator of the control valve is required as a result of a desired change in functionality, in particular when the valve stem is deeply threaded into the stem connector, a relatively large amount of assembly work must often be performed by inexperienced personnel in order to achieve the disengagement of the stem connector from the valve stem.

SUMMARY

It is an object to provide a control device for a technical processing plant that is easily mountable and unmountable and allows for easy recognition and setting of the maximum stroke length of the control valve.

In a control device for a technical processing plant, a pneumatically driven actuator having an actuator stem is provided together with a valve operated by the actuator, the valve having a valve stem. A valve element is attached to the valve stem. A stem connector connects the two stems to each other for a forced transmission of axial actuating movements and for modifying an axial distance between adjacent ends of the valve stem and the actuator stem to adjust a total axial length of the two stems. The stem connector comprises two half-shells connected to each other, and two positioning devices are provided for a friction-locking coupling of the half-shells to the respective ends. At least one of the positioning devices is designed to modify an axial attachment position of the half-shells along one of the stems.

DESCRIPTION OF THE PREFERRED EMBODIMENTS

Figures 1, 1A:
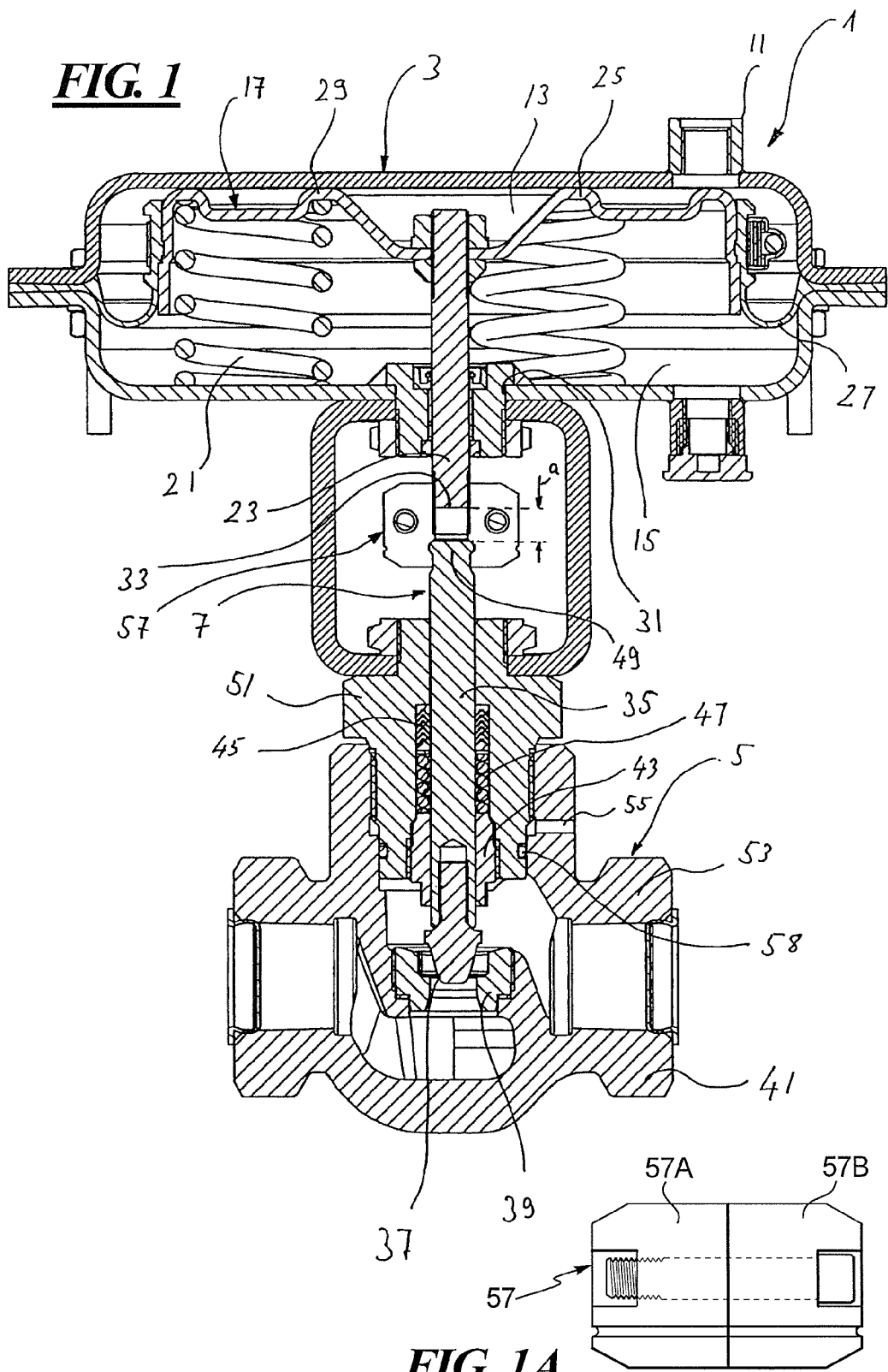
FIG. 1 illustrates a cross-sectional view of a control device in a first embodiment, wherein a large total length of the stem arrangement is realized.
FIG. 1A is a side view showing two half-shells of a stem connector shown in FIG. 1.

For the purposes of promoting an understanding of the principles of the invention, reference will now be made to the preferred embodiments/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

A control device is provided for a technical processing plant as defined above for example. The control device has an in particular pneumatically driven actuator having an actuator stem. Furthermore, the control device has a valve with a valve stem actuated by the actuator, the valve stem being in particular arranged in axial prolongation of the actuator stem. Preferably the longitudinal axis of the actuator stem is in line with the longitudinal axis of the valve stem. At the end of the valve stem a valve element is attached. Since the valve stem and the actuator stem are two separate stem portions, a stem connector is to be provided connecting the two stems for a force transmission of in particular axial, translational positioning movements and being designed for modifying an axial distance between ends of the valve stem and the actuator stem facing each other, in order to make the total axial length of both stems adjustable. According to a preferred embodiment the stem connector comprises two shells, in particular half-shells, to be connected to each other, that are preferably connected to each other via two bolts. At the actuator side and the valve stem side, respectively, the shells have a preferably variable positioning device in order to couple and to position by means of a friction fit the shells at different positions of the respective end sections of the actuator stem and the valve stem. At least one of the positioning devices is designed for modifying the axial attachment position of the shells along one of the stems, preferably along the valve stem.

The shells enable an unmounting of the connector as fast as possible independently of the kind of positioning device so that the valve stem and the actuator stem can be operated independently from each other for example for a repair or a change in functionality of the control valve. Preferably the positioning devices are realized by different mechanical coupling principles, for example by a thread engagement on the one side and a tenon-groove-engagement, axially indisplaceable, on the other side. In particular when at the actuator stem a variable positioning device is provided, i.e. the valve stem can be coupled to the stem connector in only one single position, a permanently constant axial length of stem connector and valve stem is achieved, whereby reliable statements can be made concerning the opening gap of the valve element. The adjustability of the axial distance between the ends of the valve stem and the actuator stem is preferably achieved exclusively by a variable positioning device at the actuator stem side, for example by means of a thread structure.

In a preferred embodiment of the invention the shells have a thread, in particular an internal thread, only in the area facing the actuator in order to continuously adjust the axial distance. Preferably the shells can form an encompassing contour at the area facing the valve stem, the contour being axially indisplaceable and cooperating with a head at the end of the valve stem in order to axially couple the shells to the valve stem. In this way a rotation of the shells with respect to the valve stem is possible without engendering a rotational positioning of the valve stem relative to the connector. However, the rotation of the stem connector causes an axial displacement of the actuator stem.

Preferably an axial abutment is realized within the pneumatic actuator by means of a support plate or by means of a free end of the actuator stem which abuttingly cooperates with an inside of the actuator housing. Through the adjustability of the position of the actuator stem relative to the connector, the total length of the stem arrangement can be adjusted at will whereby an adjustability of the maximum stroke length of the valve stem is achieved owing to the abutment.

In a preferred embodiment of the invention at least one of the positioning devices, preferably both positioning devices, are void of threads with respect to the adjustability of the axial distance between the ends. Preferably at least one of the positioning devices, preferably both positioning devices, has at least three circumferential grooves offset in axial direction and preferably formed at the inside of the half-shells or at the outside of the actuator stem or the valve stem. The grooves match with at least one annular protrusion complementary in shape and formed preferably at the valve stem as well as at the actuator stem. Therein the annular protrusions can engage with each of the grooves in order to be positioned at various positions at the stem connector, so that a multitude of total lengths and thus a multitude of different maximum stroke lengths can be achieved. By means of the groove-annular protrusion-arrangement a stepped adjustment of the axial distance and thus the total length of the stem arrangement is provided.

In a further development of the preferred embodiment of the invention the stem connector is designed at its side facing the valve so that merely one axial attachment position of the stem connector can be adopted relative to the valve stem. Preferably only an area of the stem connector at the side of the actuator stem is designed such that at least two predetermined positions of the stem connector, axially offset to each other, are provided relative to the actuator stem. In this way a person is not induced to consider two different attachment positions between the stem connector and the valve stem. In this way it is achieved also for inexperienced operating persons that the axial length of the stem connector and the valve stem remains constant in order to maintain the advantage of the easy recognizability of the maximum stroke length of the control valve. In a preferred embodiment of the invention the shells have several grooves, one groove of which, adjacent to the valve stem, is dimensioned differently with respect to the other grooves, preferably larger. In this way only one annular protrusion at the valve side fits into the groove to be received in the latter complementary in shape. A further annular protrusion is provided at the actuator stem to fit into the other grooves. In this way faulty mounting of the annular protrusion at the valve stem side into the several adjustment grooves can be excluded.

In a further embodiment of the invention, in an entry area into the valve housing, a display for visualising the position of the valve element is formed at the outside of the valve stem and/or in an entry area into the actuator housing at the outside of the actuator stem. Preferably the display is realized through a surface engraving or through a visual representation at the surface via a contrast difference. In a preferred embodiment the display has the shape of an isosceles triangle, wherein in particular an axis of symmetry of the display is aligned with the axial direction of the two stems. Therein the tip of the isosceles triangle is disposed on the axis of the axial direction.

In a further embodiment of the invention the display is disposed such that for a maximum and/or minimum total length for a completely open or completely closed valve the display is just completely covered by the actuator or valve housing or by the shells or just completely uncovered by the latter for complete conspicuousness.

Further qualities, advantages and features of preferred embodiments become apparent by means of the following description in following drawings.

In FIGS. 1 to 7 three different preferred embodiments of the invention are presented. In all of the drawings the control device is generally referred to by reference numeral 1.

The control device 1 comprises essentially three main components, that is: a pneumatic actuator 3, a control valve 5 as well as an arrangement 7 of force transmission stems by means of which the positioning movement is transmitted from the pneumatic actuator 3 onto the control valve 5.

The pneumatic actuator 3 has a pneumatic input 11 via which a pneumatic working chamber 13 can be exposed to a pneumatic actuating pressure of, for example, 6 bar. The pneumatic working chamber 13 is separated from a reset chamber 15 via a support disc-membrane arrangement 17 in a fluid-tight manner, wherein reset springs 21 are disposed inside the reset chamber 15.

An actuator stem 23 is attached to a support disc 25 to which a separation membrane 27 is attached. The support disc 25 has an abutment 29 limiting an axial movement of the actuator stem 23 upwards. The actuator stem 23 extends to the reset chamber 15 towards and through an actuator housing opening 31 and has an end 33 facing the valve.

The control valve 5 is designed with a valve stem 35 arranged vertically and axially aligned with the actuator stem 23, wherein a valve element 37 is threaded into the end of the valve stem facing away from the actuator 3. The valve element 37 serves the purpose to clear and/or to close an opening of a valve seat 39 in order to provide or to obstruct a flow through a conduit system 41.

A guide sleeve 43 at the valve seat as well as a sealing package of V-shaped sealing elements 45 is provided for guiding the valve stem 35, the sealing elements 45 being preloaded by a compression spring 47.

The valve stem extends from an end 49 facing the actuator through a guide insert 51 at which are disposed the guide sleeve 43, the compression spring 47, as well as the valve package 45.

A leakage bore is formed in the valve housing 53, via which a leakage can be detected if an o-ring 58 cannot provide the desired static sealing function any longer. For connecting the valve-side end 33 of the actuator stem 23 to the actuator-side end 49 of the valve stem 35 a stem connector 57 is provided that is realized by two half-shells 57A and 57B shown in side view in FIG. 1A, only one of which is represented in the Figures. The two half-shells 57A and 57B are attached to each other by means of a pair of screws.

The stem connector 57 has a positioning device at its side facing the valve as well as at its side facing the actuator, the positioning device at the actuator side being realized as a thread in the embodiment shown in FIG. 1.

At the valve-side end 49 of the actuator stem 23 a coupling head is formed that is tightly surrounded and held by the half-shells by means of a respective groove shape. In this way a defined attachment position of the stem connector 57 is realized with respect to the valve stem 35.

Figure 2:
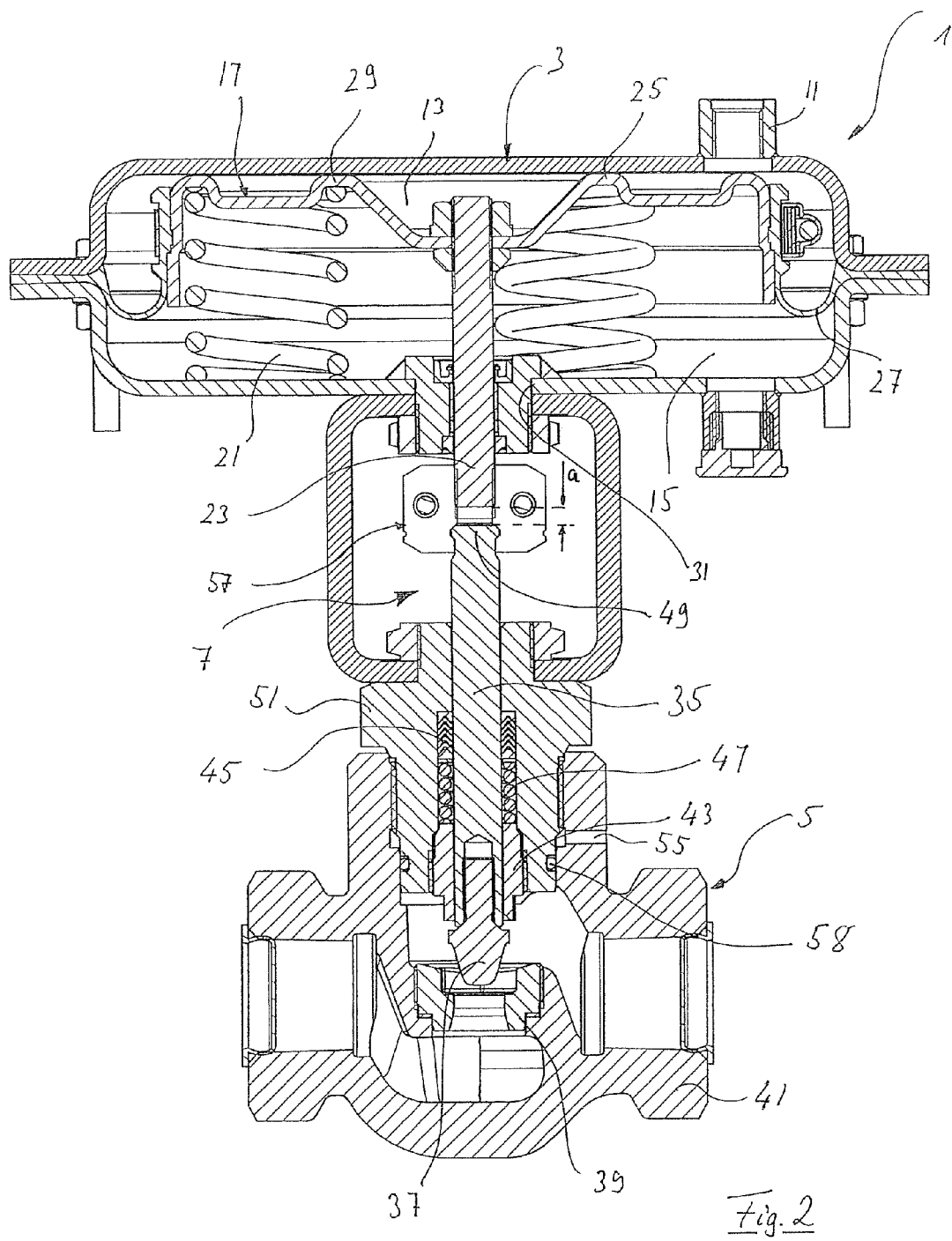
FIG. 2 is a cross-sectional view of the embodiment according to FIG. 1 with a shorter total length.

As is visible from a comparison of FIGS. 1 and 2, the axial distance a between the ends 33 and 49 can be adjusted by operating the half-shells of the stem connector 57.

As the ends 33, 49 move apart from each other, as recognizable in FIG. 1, the total length of the stem arrangement, comprised of the actuator stem 23, the axial distance a as well as the valve stem 35, increases so that the maximum stroke length that the final control element 37 is able to perform with respect to the valve seat 39 is reduced. The delimiting of the stroke length is realized by the abutment 29 of the support disc 25 coming into contact with the inner side of the actuator housing, as from FIGS. 1 and 2. The comparison of FIGS. 1 and 2 also shows that the passage opening cleared by the valve element 37 at the valve seat 39 is considerably larger than in FIG. 1, which follows from the reduced axial distance a.

If, owing to changes of the flow characteristics of the control valve at the valve element, a replacement of the valve stem 35 including the valve element 37 becomes necessary, the half-shells of the stem 35 simply need to be removed by untightening the pair of screws, whereby a separate access to the valve stem 35 becomes possible. Also a replacement of the entire control valve can be achieved by means of disengaging the half-shells of the stem connector 57.

Figure 3:
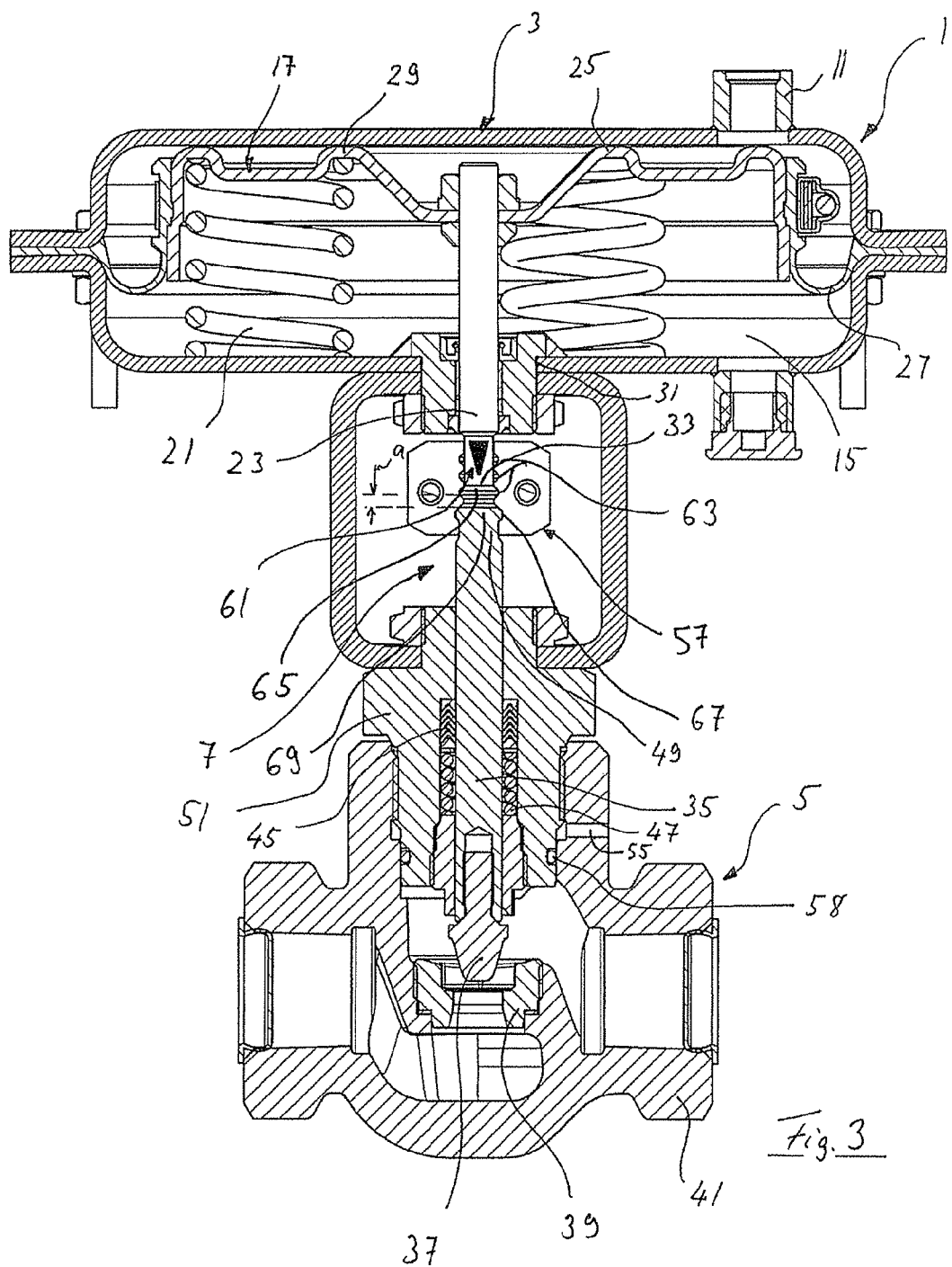
FIG. 3 is a cross-sectional view of a second embodiment with a shortest total length of the stem arrangement.
Figure 4:
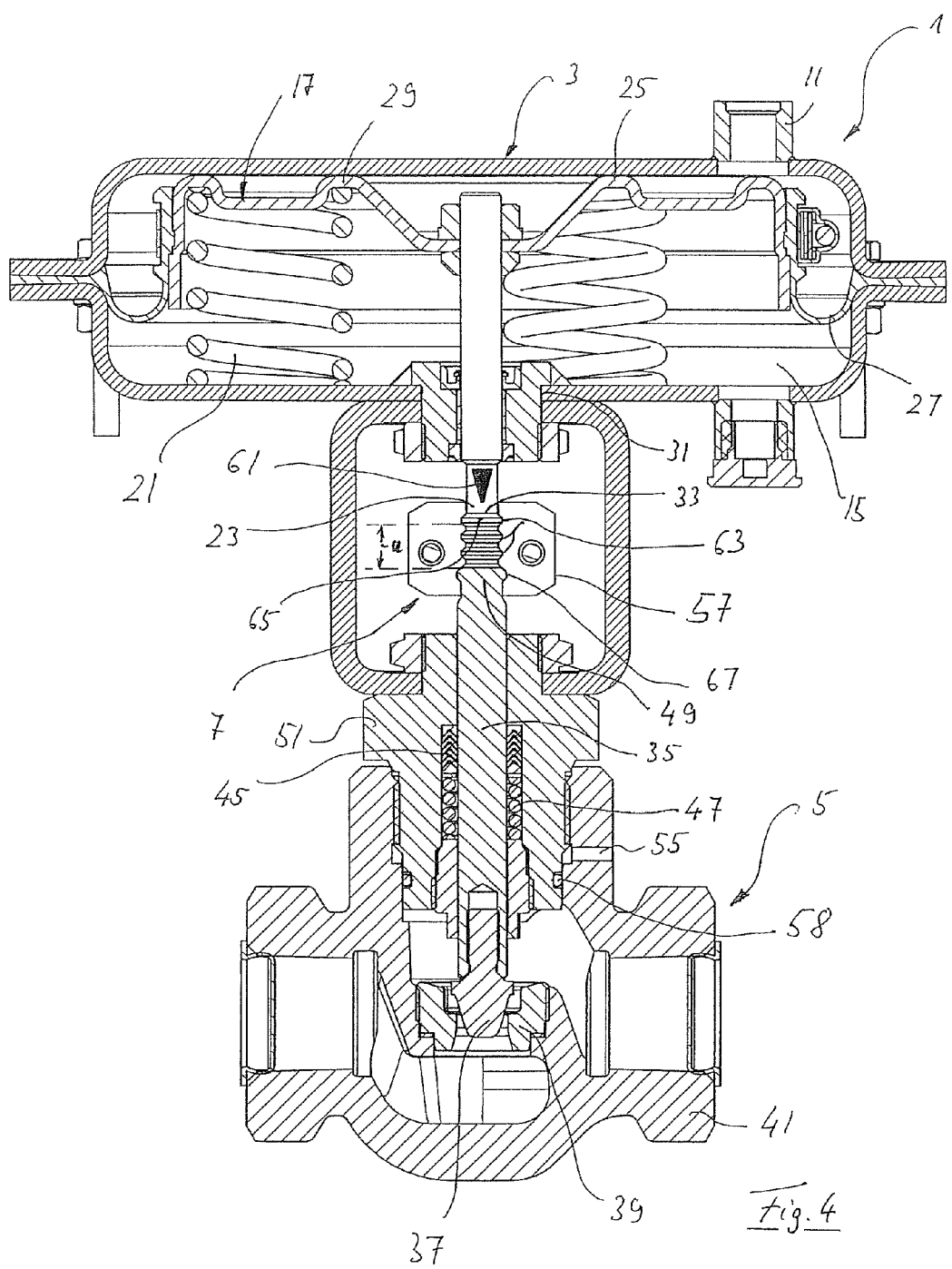
FIG. 4 is a cross-sectional view of the embodiment according to FIG. 3 with a longest total length.

The embodiment according to FIGS. 3 and 4 differs from the embodiment according to FIGS. 1 and 2 with respect to two components, that is the stem connector 57 and a stroke length limitation indicator 61.

In contrast to the stem connector according to FIGS. 1 and 2, in the embodiment shown in FIGS. 3 and 4 a threadless stem connector is provided.

The positioning device, also realized at the actuator side, is stepped in the embodiment according to FIGS. 3 and 4. The stepped positioning device comprises three circumferential, equally formed positioning grooves 63, arranged at a distance from each other and parallel to each other. The distances between the positioning grooves 63 are equal.

The actuator stem has at its end 33 an annular protrusion 65 arranged complementary in shape with the positioning grooves 63. The positioning groove (63)—annular protrusion (65)—arrangement enables to create three different total lengths of the stem arrangement, two of which are represented in FIGS. 3 and 4 as extreme positions.

The embodiment according to FIGS. 3 and 4 is identical to the embodiment according to FIGS. 1 and 2 with respect to the coupling of the valve stem to the stem connector 57. The attachment groove 67 is formed clearly larger than the positioning grooves 63, wherein the annular protrusion 69 at the actuator-side end 49 of the valve stem 35 is complementary in shape to the attachment groove 67. Owing to the different dimensions of the annular protrusion 69 and the attachment groove 67 with respect to the positioning grooves 63 it is prevented that an inexperienced operating person will consider a connection between the stem connector 57 and the valve stem 35 different from the one for which the attachment groove 67 cooperates with the annular protrusion 69.

As evident from FIGS. 3 and 4, a filled, isosceles triangular display is presented at the outside of the actuator stem. In the position represented in FIG. 3 with minimum total length of the stem arrangement the display 63 is just completely covered by the stem connector 57. Thus, an operating person is aware that the minimum stem length is set and thus the maximum stroke length is realized.

In the operating position according to FIG. 4 the total length of the stem structure is maximized through the annular protrusion 65 being set into the positioning groove 63 closest to the actuator 3. Therein the triangular display is just completely uncovered by the shells of the stem connector, which indicates to an operating person that the smallest maximum stroke length is set. When the triangular display is positioned the tip is pointing downwards.

Figure 5:
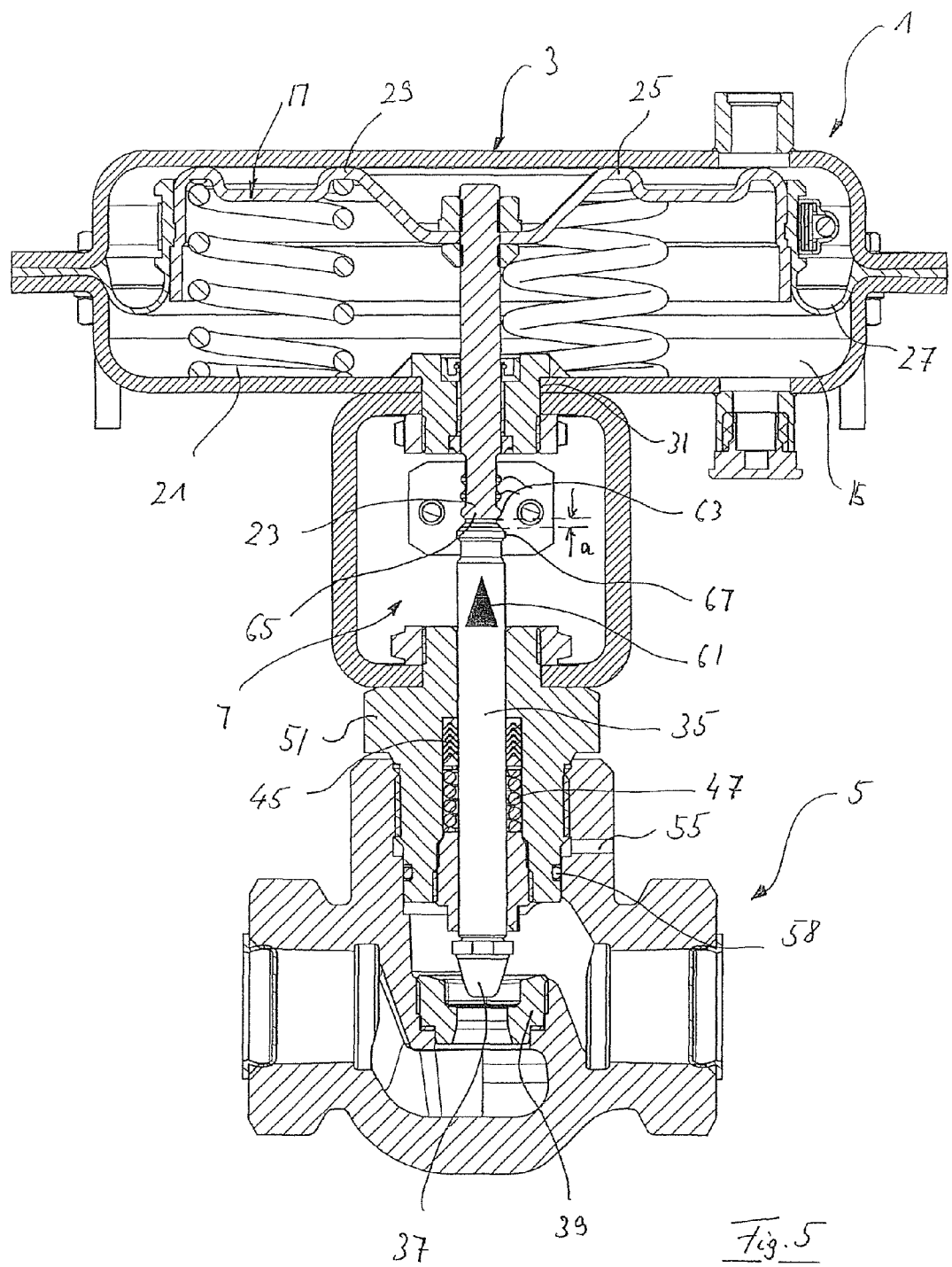
FIG. 5 is a cross-sectional view of a third embodiment with a shortest total length of the stem structure.
Figure 6:
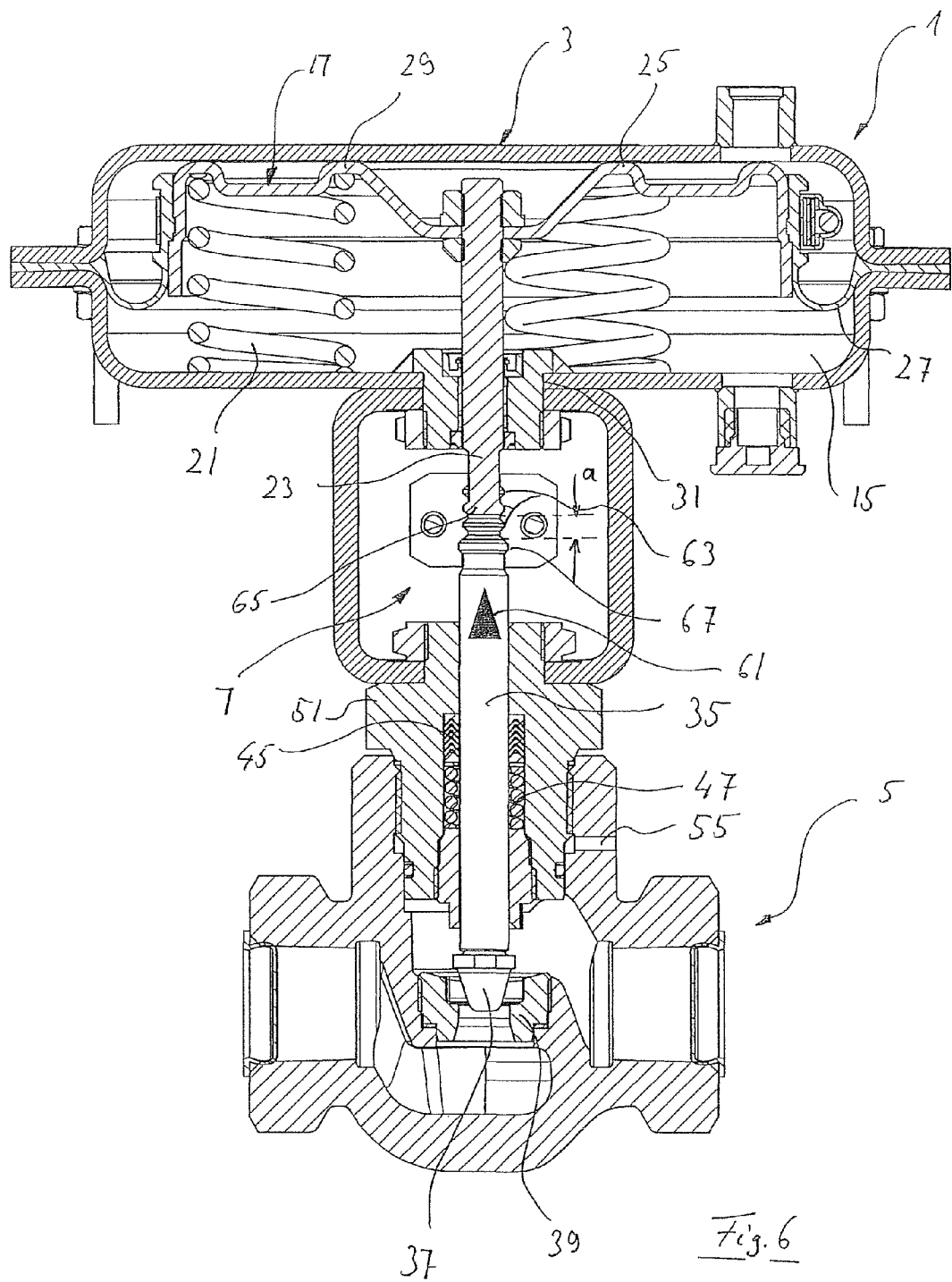
FIG. 6 is a cross-sectional view of the embodiment according to FIG. 5 with a medium total length.
Figure 7:
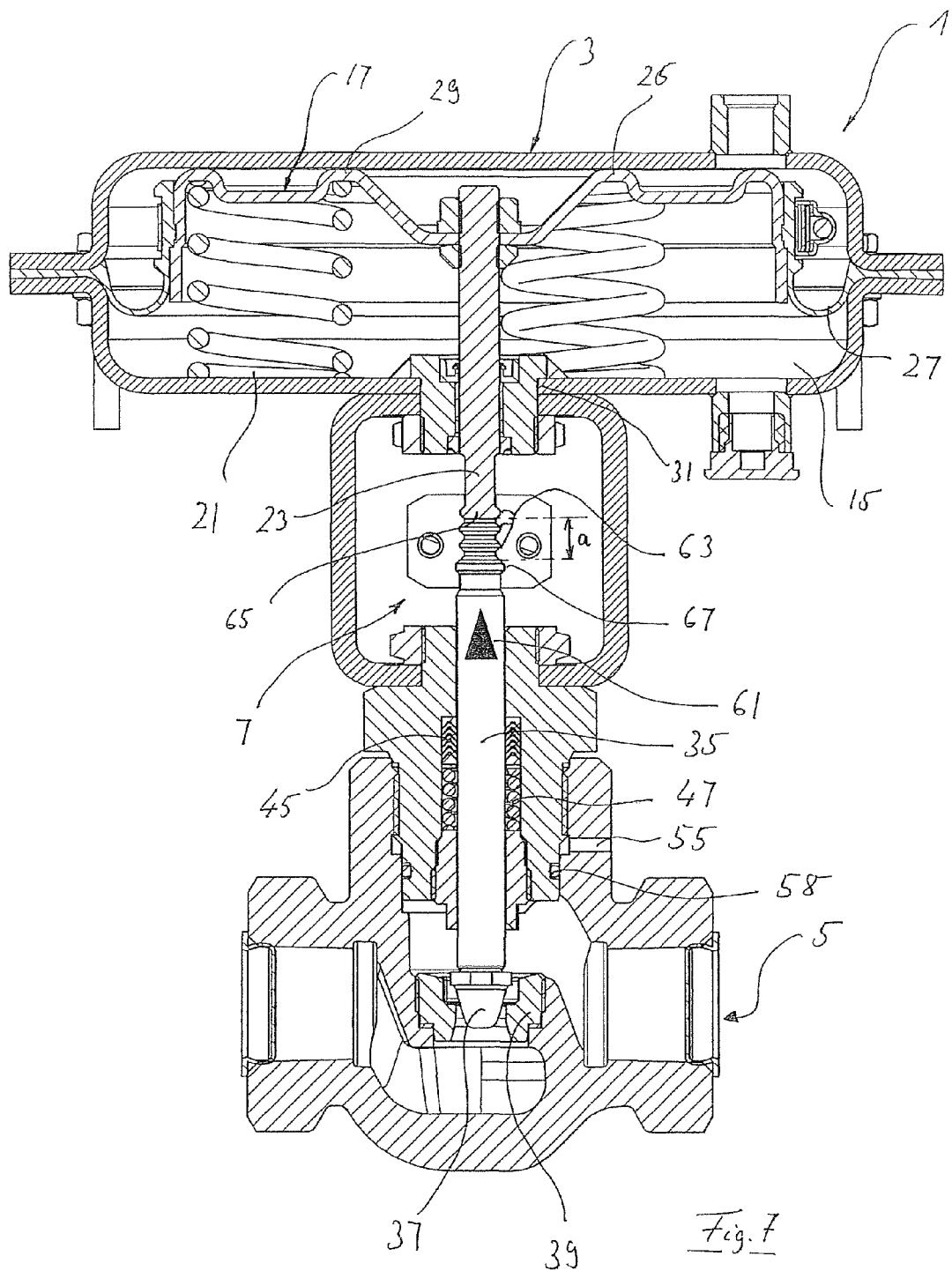
FIG. 7 is a cross-sectional view of the embodiment according to FIGS. 5 and 6 with a longest total length of the stem arrangement.

The embodiment according to FIGS. 5, 6 and 7 differs from the one according to FIGS. 3 and 4 by a different triangular display which is disposed at the outside of the valve stem. As shown in FIG. 5, the triangular display is just completely exposed by the valve insert 51. This complete exposure is achieved by the annular protrusion 65 occupying the positioning groove 63 closest to the valve element 37. In this way the shortest total length of the stem structure is achieved, by means of which the largest maximum valve stroke length is achieved.

In FIG. 6 an intermediate position is represented, while FIG. 7 indicates the end position for the smallest maximum stroke length, wherein the total length of the stem arrangement is largest. In this position the tip of the triangle just protrudes freely in order to indicate to an operating person the maximum delimited stroke length and thus the largest passage opening at the valve element.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. A control device for a technical processing plant, comprising:
   a pneumatically driven actuator having an actuator arm with a connected actuator stem;
   a valve operated by the actuator, said valve having a valve stem arranged in axial prolongation of the actuator stem;
   a valve element attached to the valve stem;
   a stem connector connecting the valve stem and the actuator stem to each other for a forced transmission of axial, translational actuating movements and for modifying an axial distance between adjacent ends of the valve stem and the actuator stem in order to adjust a total axial length of the valve stem and the actuator stem;

the stem connector comprising two half-shells to be connected to each other, and first and second positioning devices for a friction-locking coupling of the half-shells to the respective ends, at least the first positioning device being designed to modify an axial attachment position of the half-shells along one of the stems;

the second positioning device comprising an encompassing contour formed by said half-shells at an area facing the valve stem, said contour cooperating with a head at the end of the valve stem for axially coupling the half-shells to the valve stem;

at an area of entry into a housing of said actuator a display formed at an outer side of the actuator stem for visualizing a position of the valve element; and the display being at least partially covered for a first axial distance between said ends of the valve stem and the actuator stem, and not being covered or being covered less for a second axial distance between said ends of the valve stem and the actuator stem, said covering being performed by said half-shells.

2. The control device according to claim 1 wherein the display comprises an isosceles triangle.

3. The control device according to claim 1 wherein said first positioning device comprises a thread provided at an area of the half-shells facing the actuator stem, said thread being an internal thread for continuously adjusting said axial distance.

4. The control device according to claim 1 wherein said first positioning device does not use a thread for adjustability of said axial distance.

5. The control device according to claim 1 wherein said first positioning device comprises at least three circumferential grooves offset in the axial direction and that are formed at an inner side of the half-shells, and at least one annular protrusion complementary in shape to the grooves at the end of the actuator stem to define the axial attachment position of the stem connector relative to the actuator stem.

6. The control device according to claim 1 wherein the second positioning device for the stem connector is designed at a valve stem side such that only one axial attachment position is adopted by the stem connector relative to the valve stem, and wherein said first positioning device of said stem connector is designed so that at least two predetermined positions of the stem connector are adoptable relative to the actuator stem.

7. The control device according to claim 1 wherein the end of the actuator stem has at least one annular protrusion, and wherein the half-shells comprise several grooves, one of which adjacent to the valve stem is dimensioned differently from other of the grooves so that only said one annular protrusion at the valve stem side fits complementary in shape to be received in the one groove, and wherein a further annular protrusion is provided at the actuator stem for fitting into one of the remaining grooves.

* * * * *